(No Model.)

P. KAHLER.
JOCKEY STICK.

No. 453,370.

Patented June 2, 1891.

Witnesses:
P. P. Sheehan
M. S. Belden

Inventor
Peter Kahler
by James W. See
Attorney

UNITED STATES PATENT OFFICE.

PETER KAHLER, OF STAR CITY, INDIANA.

JOCKEY-STICK.

SPECIFICATION forming part of Letters Patent No. 453,370, dated June 2, 1891.

Application filed February 11, 1891. Serial No. 381,071. (No model.)

*To all whom it may concern:*

Be it known that I, PETER KAHLER, of Star City, Pulaski county, Indiana, have invented certain new and useful Improvements in Jockey-Sticks, of which the following is a specification.

This invention pertains to improvements in jockey-sticks for use by farmers and others, especially when driving a team with a single line.

My improvements will be readily understood from the following description, taken in connection with the accompanying drawings, in which—

Figure 1:
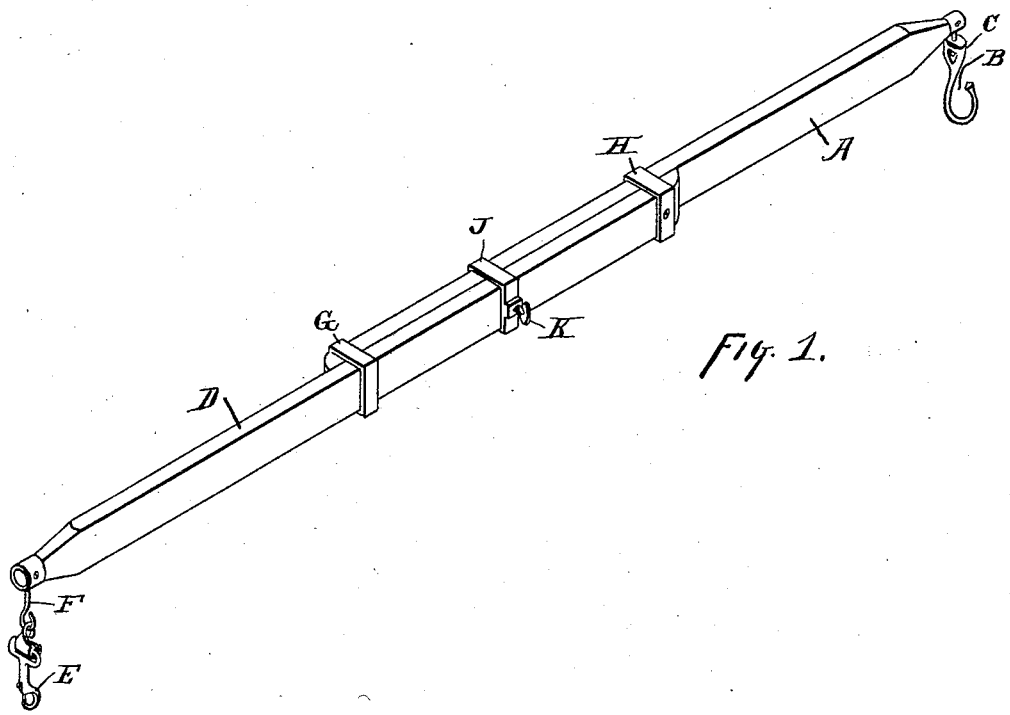
Figure 2:
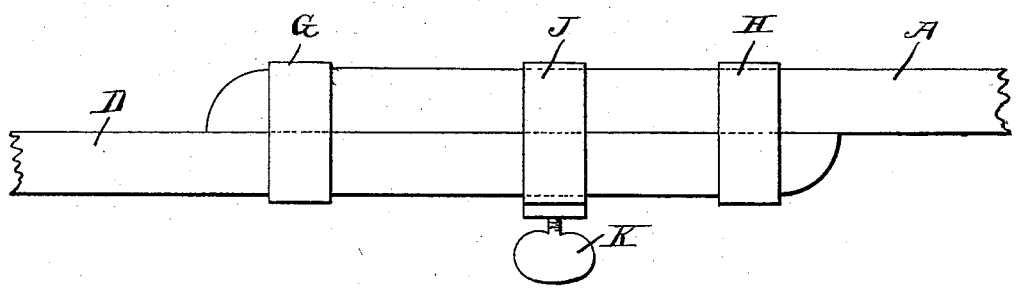

Figure 1 is a perspective view of a jockey-stick embodying my improvements; and Fig. 2 a plan at the central part thereof, upon a somewhat enlarged scale.

In the drawings, A indicates a stick about three and one-half feet long having one side flat, and having, preferably, a rectangular cross-section; B, a hook attached at the outer end of this stick; C, a swivel uniting this hook to the stick, the stem of the swivel projecting at right angles to the stick, so that the hook projects at right angles to the stick, but is capable of swiveling upon the stem of the swivel; D, a second stick similar to the first one and disposed flatwise against the first one and adapted to shift endwise along the same when the length of the entire structure is to be adjusted; E, a light snap-hook attached to the outer end of this second stick; F, a stem projecting rigidly two inches or so at right angles to this stick and having the snap-hook E shackeled to it; G, a band encircling the two sticks at the inner end of stick A and secured to stick A; H, a similar band encircling the two sticks and secured to stick D; J, a band encircling the two sticks between the previously-mentioned bands and not secured permanently to either stick; and K, a set-screw in the band J, whereby this band serves as a clamp-band to clamp the two sticks together in position of lengthwise adjustment.

In using this jockey-stick the hook B is hooked into the hame-ring of the near horse and the hook E is snapped into the bit-ring of the off horse. By loosening screw K the two sticks may be adjusted endwise and then firmly secured, giving to the entire jockey-stick such length as will keep the horses at a proper distance from each other and prevent them from moving from and toward each other at will, the distance being adjustable as desired, from three and one-half to about six feet. The swiveling of hook B permits the hook to be used right or left handed, and the rigid projection of stem F keeps the end of the stick from chafing the horse's jaw.

I claim as my invention—

In a jockey-stick, sticks A and D, bands G and H, clamp J K, and hooks B and E, substantially as and for the purpose set forth.

PETER KAHLER.

Witnesses:
WM. MOYER,
H. P. LOW.